United States Patent [19]

Maresca, Jr. et al.

[11] Patent Number: 4,646,560
[45] Date of Patent: Mar. 3, 1987

[54] SYSTEM AND METHOD FOR LEAK DETECTION IN LIQUID STORAGE TANKS

[75] Inventors: Joseph W. Maresca, Jr., Sunnyvale; Christopher P. Wilson, La Honda, both of Calif.

[73] Assignee: Vista Research, Inc., Palo Alto, Calif.

[21] Appl. No.: 832,268

[22] Filed: Feb. 21, 1986

[51] Int. Cl.⁴ ............................................. G01M 3/26
[52] U.S. Cl. ........................................ 73/49.2; 73/299
[58] Field of Search .................................. 73/49.2, 299

[56] References Cited

U.S. PATENT DOCUMENTS

| Re. 31,884 | 5/1985 | Hansel et al. | 73/49.2 |
|---|---|---|---|
| 3,460,386 | 8/1969 | Guignard | 73/299 X |
| 3,537,298 | 11/1970 | Kapff | 73/49.2 |
| 3,538,745 | 11/1970 | Wright et al. | 73/49.2 |
| 3,538,746 | 11/1970 | Jacobs et al. | 73/49.2 |
| 3,580,055 | 5/1971 | White | 73/49.2 |
| 4,186,591 | 2/1980 | Mooney | 73/49.2 |
| 4,281,534 | 8/1981 | Hansel | 73/49.2 |
| 4,386,525 | 6/1983 | Mooney | 73/49.2 |

FOREIGN PATENT DOCUMENTS 276474 7/1970 U.S.S.R. ............................... 73/49.2

OTHER PUBLICATIONS

Maresca, Joseph W., Jr., "A Method of Determining the Accuracy of Underground Gasoline Storage Tank Leak Detection Devices," *Proceedings: Underground Tank Testing Symposium*, Toronto, May 25-26, 1982, pp. 1-60.

Primary Examiner—Stewart J. Levy
Assistant Examiner—Joseph W. Roskos

[57] ABSTRACT

A tube vertically disposed in a liquid storage tank, in which the tube has a cross-sectional area which changes with height in proportion to the variation in the tank's cross-sectional area. The tube is filled through an open valve near the bottom of the tube and the valve is closed for the remainder of the test. Other valves above the liquid level are kept open to maintain equal vapor pressures in the tank and the tube. A first sensor measures the fluid level in the tank, while a second sensor measures the differences in fluid levels between tank and tube over a period of time. Ambient height changes are identical for liquid in both tank and tube, whereas leak related height changes occur only in the tank. A second identical tube may be provided when levels are affected by the tube or sensor, or when the tube is required to hold the sensor and is open to the tank.

20 Claims, 17 Drawing Figures

SYSTEM AND METHOD FOR LEAK DETECTION IN LIQUID STORAGE TANKS

DESCRIPTION

1. Technical Field

The present invention relates to measuring and testing of leakage in liquid storage tanks and in particular to noise compensation in leak detection systems for such tanks.

2. Background Art

In U.S. Pat. No. 3,538,746, Jacobs et al. disclose a leak detecting method and apparatus in which a constant diameter tubular chamber, inserted into the tank, receives fluid so that pressures in the tank and chamber come to equilibrium, thereby establishing a reference pressure in the chamber. The chamber is then closed to communication with the tank. A differential pressure gauge attached to the chamber simultaneously senses the pressure within the interior of the chamber and the pressure exterior to the chamber. Any leakage in the tank will be detected as a change in the pressure difference.

In U.S. Pat. No. 3,538,745 to Wright et al., a float replaces the differential pressure gauge of Jacobs et al. Since either tank leakage or a change in temperature is responsible for changes in liquid level, a temperature-compensating network which measures the temperature of the liquid at one point and subtracts it from a reference temperature to generate a signal which compensates for the temperature change, thereby providing a resultant signal representing a change in liquid level due to leakage only.

In U.S. Pat. No. 3,580,055, White teaches a test apparatus including a fluid circulation system which continuously circulates fluid in the tank to equalize the temperature of the fluid in the tank, and permit accurate compensation for temperature variations in the system.

In U.S. Pat. No. 4,186,591, Mooney teaches the use of a buoyant member floating on the surface of the liquid in a fill pipe. The height of the buoyant member and the temperature of the liquid within the tank are monitored over a period of time. Temperature is monitored using an array of five temperature sensors. Any fall of the buoyant member that is not proportional to any change of the average temperature of the liquid indicates a leak in the tank. In U.S. Pat. No. 4,386,525, Mooney also monitors evaporation of liquid in a separate cup from the surface of the fill pipe.

In U.S. Pat. No. 4,281,534 to Hansel, a sensor for measuring mass displacement in a leaking constant diameter tank comprises a main body portion suspended from a balance arm or other mass displacement detector and a liquid holding portion in the main body for holding liquid above the level of liquid in the tank. The crosssectional area of the liquid holding portion is essentially equal to the cross-sectional area of the main body portion in contact with the liquid in the tank. This enables evaporation losses to be compensated.

In order to detect very small leaks, the detection system must be able to compensate for the effects of expansion and contraction of the liquid produced by temperature changes of the liquid and the effects of evaporation and condensation from the liquid surface. These effects cause liquid level changes in the tank which are not related to a leak.

The prior art uses a vertical array of one or more temperature sensors to estimate the mean temperature change of the liquid in the tank or a circular tube of constant diameter to measure directly the total height change induced by temperature changes. Separate measurements of specific gravity to estimate the coefficient of thermal expansion of the liquid being stored are required when temperature sensors are used. Properly weighting the temperature change by volume is required to accurately estimate the mean rate of change of volume. The minimum number of and vertical spacing of temperature sensors to achieve accurate compensation depends on the degree of compensation required. If too few sensors are used inaccurate estimates of the mean rate of change of temperature will be made. In addition, temperature changes, such as those produced by internal waves, which do not result in volume changes may also be measured and cause further error. In petroleum tanks, layering of the liquid may occur because several products of slightly different chemical composition have been combined. In this instance, the coefficient of thermal expansion must also be known for each liquid layer.

The constant diameter tube has three advantages over the temperature sensors. First, thermal expansion of the fluid is measured directly. Changes in temperature that do not effect volume changes do not effect this estimate. Second, separate measurements of specific gravity required to estimate the thermal expansion are not required. Third, the liquid level changes produced by evaporation or condensation are also measured. This method of temperature compensation is only approximate and subject to error, because an error will result in a constant diameter tube if temperature changes are not uniform with depth.

It is an object of the present invention to provide a system and method for detecting and measuring leaks which will accommodate a wide range of liquids, and can reliably detect small leaks for any level of liquid in a tank.

DISCLOSURE OF THE INVENTION

The above object has been met with a system and method for detecting and measuring leaks in liquid storage tanks having a tube, vertically mounted within the tank, whose cross-sectional area changes with height in proportion to the tank's cross-sectional area. The tube's variable cross-section assures that the ambient liquid level changes due to expansion or contraction of the liquid by temperature changes of the liquid are identical in both the tube and the tank. The tube, open to the vapor space above the liquid level, also assures that the ambient liquid level changes caused by evaporation and condensation are identical in both the tank and the tube.

The tube is filled through a valve opening near the bottom of the tube and closed for the remainder of the test. The tube has other valves, those of which are above the liquid level being kept open to maintain the same vapor pressure in the tube as in the tank. Height changes that occur in the closed tube are identical to ambient height changes in the tank. On the other hand, a tank leak produces a height change in the tank but not in the tube. A sensor is then used to measure the difference in height change over time between the level in the tank and the level in the tube.

There are a large number of commercially available sensors, acoustic, optical, electromagnetic, capacitance, and pressure, which can be used to measure height precisely. These sensors can be used to measure liquid level changes directly or used to measure the vertical displacement of a float. These height measurements are converted to volume using a height-to-volume calibration table. The actual liquid level in the tank, required to use the conversion table, is measured using an absolute pressure sensor mounted at the bottom of the tube.

The system is also self-calibrating and an estimate of the height or volume of liquid in the tank is made during the first part of the tank test. A data acquisition, storage and processing subsystem determines the rate of leakage from the tank, if any, from the measurements. A second tube, identical in geometry to the first tube may be provided, particularly if floats are used to measure height or when meniscus effects are large enough to produce an error in the height measurements.

Advantages of the present invention are that compensation of these two important sources of ambient noise, i.e. temperature effects and evaporation/condensation effects, are made automatically without having to monitor the temperature of the liquid at each depth in the tank, or determine the coefficient of expansion for the particular liquid or combination of liquids being stored, or the tank may be tested for any level of liquid in the tank. The tank may be tested for any temperature change of the liquid or any mixture of liquids, even when non-uniform vertical temperature gradients are present. Thus, small leaks may be detected with a high degree of accuracy.

BEST MODE OF CARRYING OUT THE INVENTION

Figure 1:
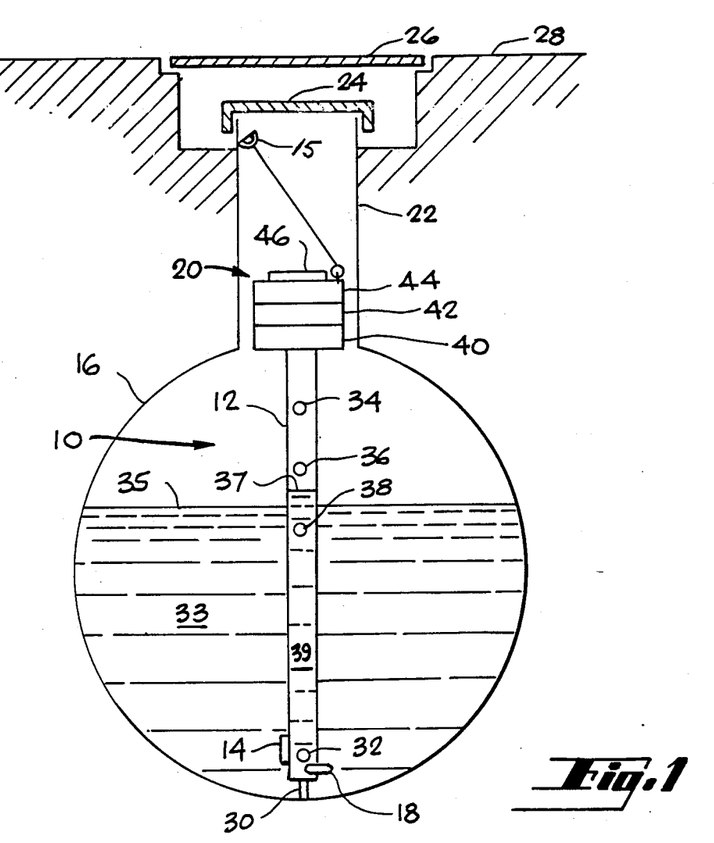
FIG. 1 is a side plan view of a first embodiment of a leak detection system in accord with the present invention.

With reference to FIG. 1, a leak detection system 10 comprises a first tube 12, a height measurement sensor subsystem having a sensor 14 for measuring the level of liquid in a tank 16 and a sensor 18 for measuring the difference between the level of liquid in tank 16 and the level of liquid in first tube 12, and a data acquisition and processing subsystem 20 for determining a rate of tank leakage from the measured liquid levels.

System 10 is intended to be used to reliably detect very small liquid leaks produced by holes or cracks in underground or partially buried storage tanks, such as tank 16, especially in those tanks containing petroleum fuels, solvents or other chemical products that would present a fire, health or environmental hazard if discharged into the ground. Tank 16 typically has a cylindrical shape and is installed on its side. Tank 16 may be made of steel, typically with flat ends, or of fiberglass, typically with hemispherical ends. However, the present invention is not limited to steel or fiberglass cylindrical tanks, and system 10 may be used to detect leaks in any liquid storage tank. A fillhole 22 extends from the top side of tank 16 for the insertion of test equipment like system 10 into tank 16. Fillhole 22 is typically cylindrical in shape and from two to four inches in diameter. Provided that system 10 can be inserted through fillhole 22, the size and shape of fillhole 22 is not critical. A cap 24 covers fillhole 22 to maintain vapor pressure in tank 16 and prevent excessive evaporation of the stored liquid. A manhole cover 26 flush with the grade 28 is typically provided in addition to cap 24.

First tube 12 is vertically mountable in tank 16, being seated in position using handle 15. Tube 12 has a length which is at least as great as the diameter of the tank. An adjustable foot 30 extends from the bottom of tube 12 and rests on the bottom of tank 16. Alternatively, tube 12 may rest directly on the bottom of tank 16. Tube 12 has a valve 32, located near the bottom of tube 12, which can be opened and closed either electromechanically with a solenoid switch, or mechanically with a shaft extending from the valve to the top of the fillhole. When valve 32 is open, tube 12 is open to or in communication with tank 16 so as to admit liquid 33 from the tank into tube 12. Closing valve 32 closes tube 12 to the tank. Additional valves 34, 36 and 38 are located in the upper part of tube 12. Typically, there are three additonal valves which for an eight foot diameter tank are spaced approximately 12 inches apart in the upper 27 inches of the tube. The spacing of these valves is not critical, providing at least one valve is located above the liquid level. Some of these additional valves, that is valves 34 and 36, will be above the liquid level during a test, and are kept open to maintain the same vapor pressure in the tube as is in the tank. Those additional valves which will be below the liquid level during the test, such as valve 38 are closed prior to insertion of tube 12 into tank 16. Valves 34, 36 and 38 may be manually or electro-mechanically opened and closed.

Sensor 14 is preferably an absolute pressure sensor such as the PAA-09 series pressure sensors produced by Keller-America, Inc. Sensor 14 is located near the bottom of tube 12 and is open to tank 16 to measure a first level 35 of liquid 33 in the tank. A variety of other commercially available height measurement sensors may also be used.

Sensor 18 is preferably a commercially available differential pressure sensor, such as the PR-09 series pressure sensor manufactured by Keller America, Inc., located near the bottom of tube 12. One port is open to the closed tube 12 and the other tube is open to tank 16 so as to measure the difference between the first level 35 of liquid 33 in tank 16 and a second level 37 of liquid 39 in tube 12. Other commercially available sensors may be adapted to measure this level difference. The height measurement sensor must have sufficient precision to measure an hourly rate of change equal to or better than that produced by a 0.05 gal/hour leak over the total period of testing. A precision of 100 to 500 micro inches/hour is desired.

Data acquisition and processing subsystem 20 has a compact portable power supply 40, such as a battery, an electronics package 42, a data acquisition and processing package 44, and a digital display 46. Alternatively, 110V line power can be used as a power supply. Electronics package 42 controls the opening and closing of valves, the height measurement sensor, and other automatic functions required during a test. Data acquisition and processing package 44 samples the data from sensors 14 and 18 taken at different times during test at a rate of 5.0 Hz, averages the data to one sample/min, fits a least squares line to the data, and stores the noise compensated volume rate result. If independent measurements of the liquid level changes in closed tube 12 and the tank 16 are made, instead of a differential measurement, then the liquid level changes in the closed tube which have already been sampled at 5.0 Hz and averaged to one sample/min are subtracted from the liquid level changes in the tank which also have been sampled at 5.0 Hz and averaged to one sample/min. A least squares line is then fit to the data and the resulting noise compensated volume rate is stored. The measured noise compensated volume rate is then used to determine if the tank is leaking. This data acquisition and processing package typically comprises a controller unit, a clock, an analog-to-digital converter, a computer interface, and a microprocessor to perform data analysis known in the art. The results, i.e., whether the tank is leaking or not, the date and time of the test, and compensated volume leak rate, are displayed by digital display 46. The display may be read by removing manhole cover 26 and cap 24. Alternatively, the display may be remote, with a communications line extending from the data subsystem to the remote display.

In operation, fillhole 22 is opened and the leak detection system 10 is inserted into tank 16. Valve 32 is closed. A start button on the data processing subsystem 20 is pressed to begin the test. The system is self-calibrating and operates in an unattended mode for the entire test period.

Immediately after starting the test, calibration and instrument function tests are performed. Sensor 14 measures the first level 35 of liquid in tank 16. Valve 32 opens, opening tube 12 to tank 16 and allowing tube 12 to fill. Height-to-volume conversion is precalculated for each level of liquid in the tank using the geometry of the specific tank and permanently stored in the memory of data processing package 44. The absolute liquid level in the tank, required for height-to-volume conversion, is measured by the absolute pressure sensor 14 at the beginning of the test and turned off. Opening tube 12 induces a height change corresponding to a known volume of liquid. Measuring this height change provides a verification on the predetermined conversion factor stored in data processing package 44, as well as a check on the proper functioning of height sensor 14. Height changes that occur in open tube 12 and tank 16 are measured over a one-hour period to perform a second check on instrument performance and to allow system 10 placed in the liquid to come to thermal equilibrium with the liquid.

After the calibration and performance checks are completed, valve 32 is closed and the leak detection test period begins. The total time of the test depends on the detection performance which is required and may be from one to 12 hours, typically four to six hours. Tube 12 has a second cross-sectional area which changes with height in proportion to changes in a first cross-sectional area of the tank. Thus, ambient height changes, caused by thermal expansion and contraction of the liquid are identical for tube 12 as for tank 16. Tube 12, while closed to the liquid in the tank, is open to the vapor in the tank above the liquid. Thus, ambient height changes, caused by evaporation and condensation at the liquid surface are identical for tube 12 as for tank 16. Sensor 18 measures the difference between the second level 37 of liquid in tube 12 and the first level 35 of liquid in tank 16 over time. The mean difference measurement in a nonleaking tank will theoretically be zero and in a leaking tank will be equal to the height change induced by the leak.

Measured values are recorded over a period of time and analyzed by processing package 44 as described above. A volume rate detection criterion is applied to the difference data to determine whether the tank is leaking or not.

Figure 2:
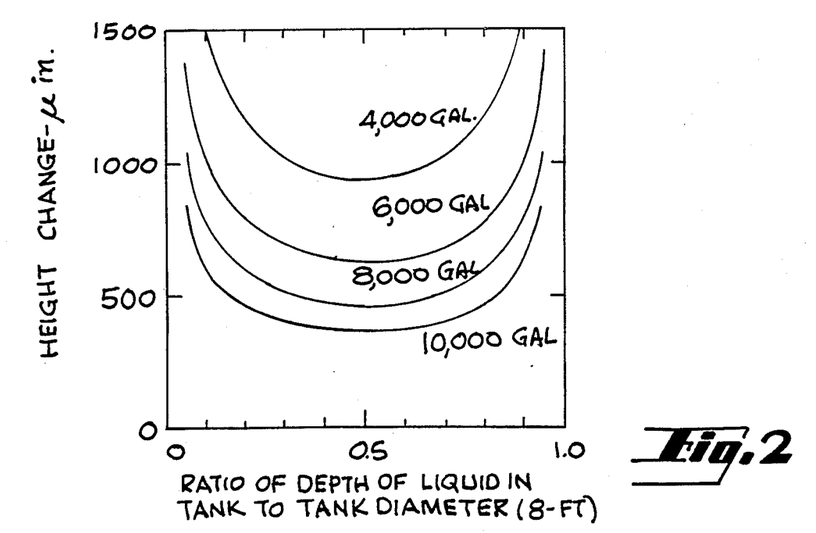
FIG. 2a is a graph showing height changes as a function of liquid level for a 0.05-gallon volume change for 8-foot diameter tanks of different capacities.
FIG. 2b is a graph showing the distribution of volume as a function of liquid level for an 8-foot diameter cylindrical tank with flat ends.

With reference to FIG. 2a, the height changes in 8-foot diameter cylindrical tanks caused by a 0.05 gallon volume change as a function of normalized liquid depth and tank capacity are presented. A leak rate of 0.05 gallons per hour results in very small height changes. In a half-full, 8000 gallon gasoline storage tank, for example, a 0.05 gallon loss would cause less than a 500 microinch height change in the liquid level. This height change is easily masked by effects other than a leak. For example, a mean gasoline change in temperature of only 0.01° F. (thermal coefficient of expansion of 0.00068° F.) would also result in a 500 micro-inch height change in a half filled 8,000 gallon tank. Temperature changes 10 to 100 times greater than 0.012° F. can occur within the first 6 to 24 hours after delivery of new gasoline. However, temperature changes of 0.01° F./hour are almost always observed in gasoline storage tanks, even many days after a delivery. Therefore, temperature compensation is always necessary.

Figures 2B, 3, 3A, 3B, 3C, 3D, 3E, 4:
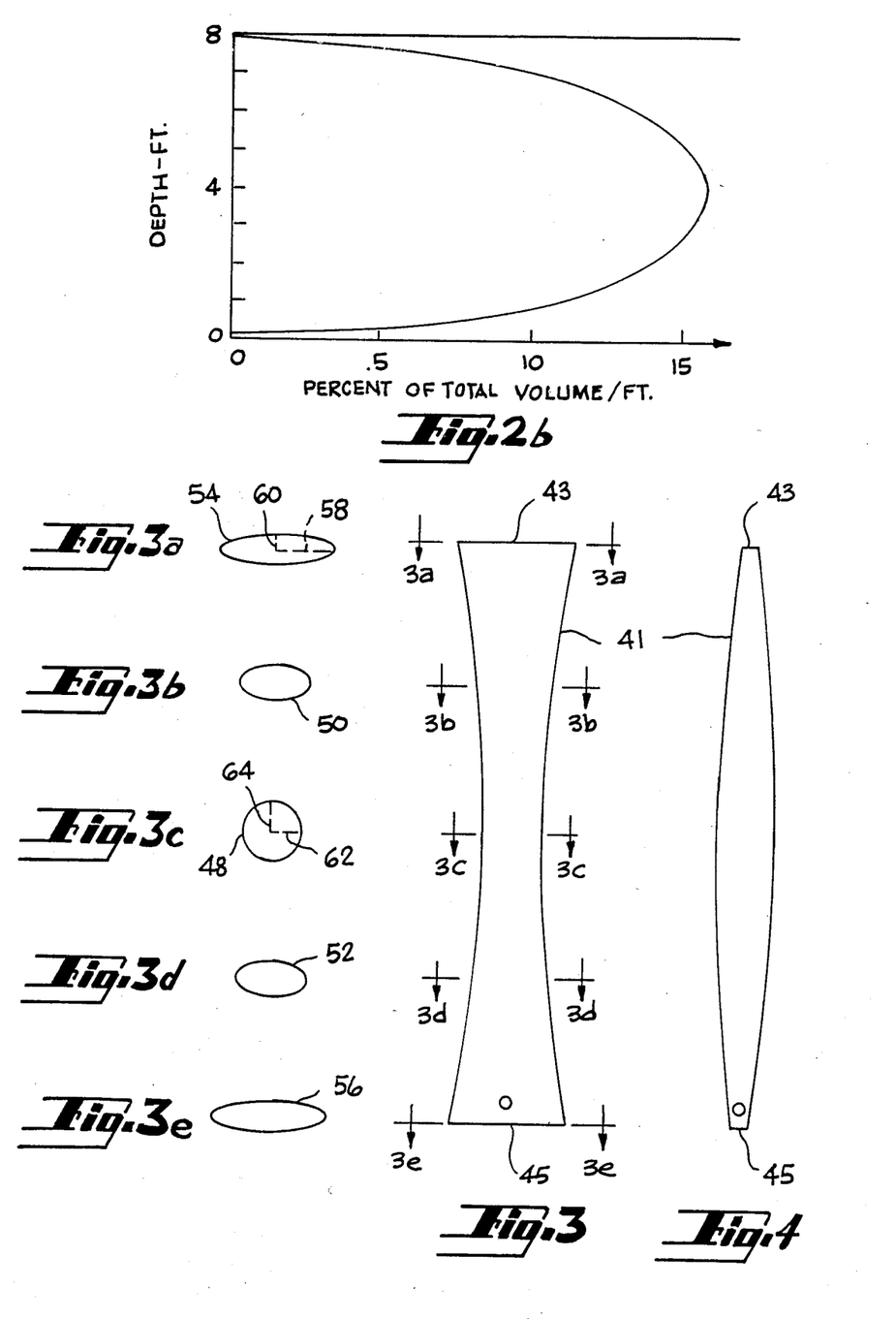
FIG. 3 is a front elevation view of a first embodiment of a measuring tube used in the system shown in FIG. 1.
FIGS. 3a—3e are sectional views of the tube of FIG. 3, taken along lines 3a—3a, 3b—3b, 3c—3c, 3d—3d, 3e—3e, respectively.
FIG. 4 is a side elevation of the tube of FIG. 3.

To compensate for height changes in liquid level due to nonleak related factors, such as thermal expansion of the product, thermal contraction of the product, evaporation and condensation of the product surfaces, tube 12 has a second cross-sectional area at each depth which changes with height in proportion to changes in the tank's first cross-sectional area. In FIG. 2b, the contribution of different heights to the total volume of an eight foot diameter cylindrical storage tank with flat ends illustrates how the tank first cross-sectional area changes with height. Since the first cross-sectional area varies nonlinearly with depth, a given liquid volume change will produce different height changes at different liquid levels 35 in the tank.

Tube 12 has a variable second cross-section that mimics that of the tank. Thus for cylindrical tanks with flat ends and installed on their sides, tube 12 should have a small cross-section at its top and bottom, i.e., at heights zero and eight feet in FIG. 2b, and a relatively large cross-section at its middle, i.e., at height 4 feet. The contribution of different heights to the total volume of the tube should equal that of the tank, as graphed in FIG. 2b. The tube design will depend on the geometry of the specific tank. For example, a tube for a cylindrical tank with flat ends will be slightly different from that for a cylindrical tank with hemispherical ends. If tube 12 extends into a cylindrical or rectangular feedhole, then the tube cross-section should be kept constant for that segment of the tube.

With reference to FIGS. 3 and 4, one construction of a tube 41 satisfying the above mentioned cross-sectional requirement has an approximately elliptical cross-section that changes with height. Such a tube is easily manufactured by deforming an initially round tube at its top and bottom ends, 43 and 45 respectively. The circumference of tube 41 is kept constant, but the area within a section of the tube decreases as it is flattened. In FIG. 3c, a section 48 at the middle of the tube 41 is circular and has a large cross-sectional area. In FIGS. 3b and 3d, sections 50 and 52 are elliptical, tube 41 having been flattened slightly these sections have areas which are smaller than section 48. In FIGS. 3a and 3e, sections 54 and 56 at the ends 43 and 45 respectively of tube 41 are very eccentric ellipses and nearly flat. Sections 54 and 56 have the smallest areas of any section of tube 41.

Figure 5:
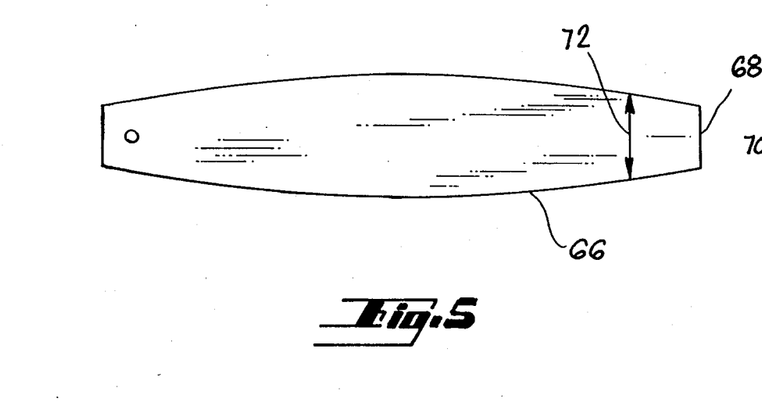
FIG. 5 is a front elevation of a second embodiment of a tube used in the system of FIG. 1.
Figure 6:
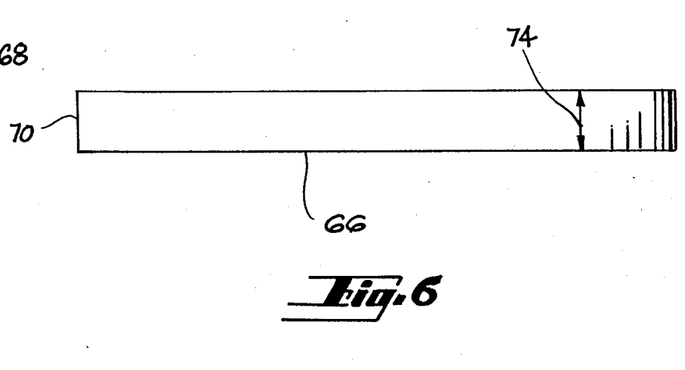
FIG. 6 is a side elevation of the tube of FIG. 5.

With reference to FIGS. 5 and 6, a second construction of a tube 66 satisfying the required changes in cross-sectional area has a rectangular cross-section. Tube 66 has sides 68 with a length, defined in the direction of arrow 72 in FIG. 5, which changes with height. Tube 66 also has sides 70 with a width, defined in the direction of arrow 74 in FIG. 6, which remain constant with height. Alternatively, width 74 of sides 70 may change with height, while length 72 of sides 68 either remain constant or also change with height. In any case, the cross-sectional area of tube 66 changes with height in proportion to changes in the cross-sectional area of the particular tank into which tube 66 is to be inserted.

Figure 7:
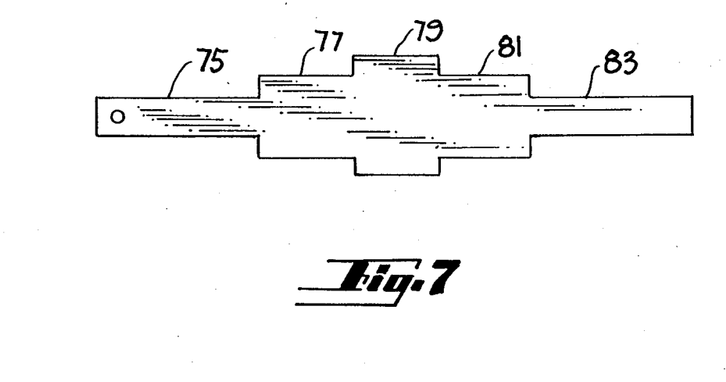
FIG. 7 is a front elevation of a third embodiment of a tube used in the system of FIG. 1.

With reference to FIG. 7, a third construction of a tube 12 satisfying the required changes in cross-section is a circular tube with three or more and preferably five segments of different diameters 75, 77, 79, 81 and 83. The length of tube corresponding to each tube diameter accounts for equal fractions of the total volume of the tank. The number of different sections of tube segments with different diameters will vary depending on the tank diameter and degree of temperature compensation desired. Tube cross-sectional area variations with height may be continuous or changing in stepwise fashion. Continuous variations may be linear or non-linear so long as cross-sectional area variations vary in height in proportion to cross-sectional area variations of the tank.

Figure 8:
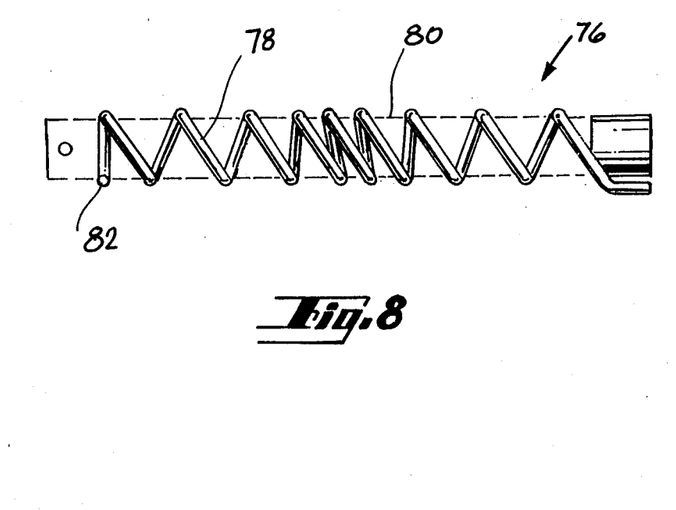
FIG. 8 is a front plan view of a fourth embodiment of a tube used in the system of FIG. 1.

With reference to FIG. 8, a fourth construction of a tube 76 comprises a constant diameter tube 78 which is wound in a spiral. Tube 78 is wound around a hollow, perforated core 80. Although tube 78 has a constant cross-sectional area, the tube construction 76 mimics a cylindrical tank cross-section by having a greater number of turns of spiral tube 78 near the center of the tank and fewer turns near the top and bottom of the tank. Since the number of turns per unit height varies with height, the tube construction 76 has an effective cross-ssectional area which varies in proportion to the tank cross-sectional area.

All tube constructions have a valve openable at the bottom end of the tube for admitting tank fluid into the tube.

Figure 9:
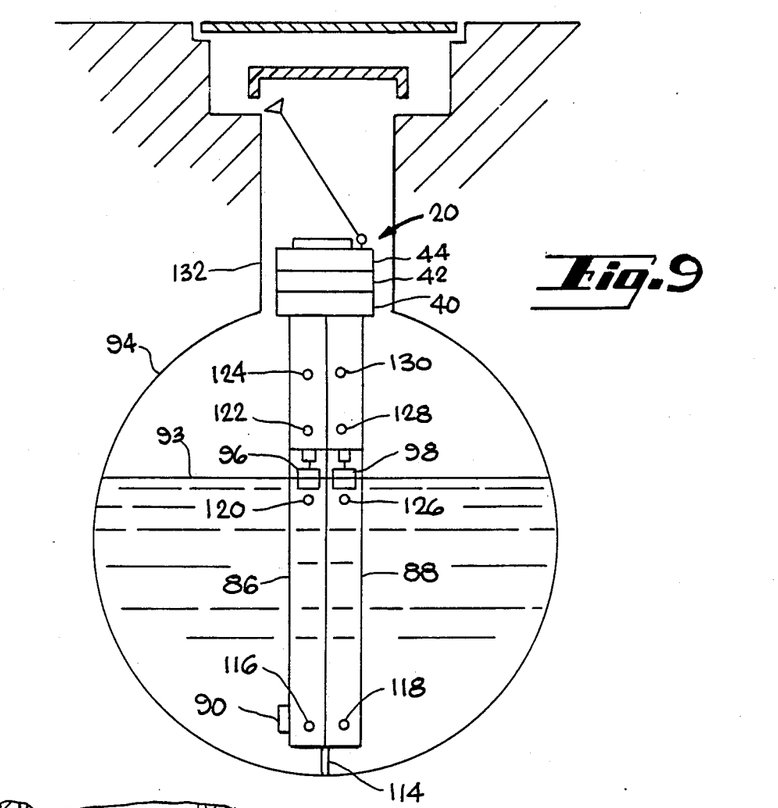
FIG. 9 is a plan view of a second embodiment of the leak detection system of the present invention.

With reference to FIG. 9, a leak detection system 84 has a pair of tubes 86 and 88 vertically mountable in a storage tank 94. This system 94 is identical to system 10 in FIG. 1, except a second tube, identical to tube 12 in FIG. 1, has been added. An adjustable foot 114 extends from the bottom of tubes 86 and 88 and rests on the bottom of the tank 94. Alternatively, the tubes may rest directly on the bottom of tank 94. Storage tank 94 is like storage tank 16 in FIG. 1, being typically a cylindrical tank lying on its side and buried or partially buried below a grade 108. Tank 94 also has a fillhole 102 extending from its upper side for allowing the insertion of system 84 into tank 94. Tank 94 has a first cross-sectional area which varies with height from the bottom of the tank. First tube 86 is like first tube 12 in FIG. 1, having a second cross-sectional area which varies with height in proportion to the variation in the first cross-sectional area of tank 94. Second tube 88 has a geometry which is identical to first tube 86, so second tube 88 has a third cross-sectional area which is equal at all heights to the second cross-sectional area of first tube 86. Any of the four tube constructions in FIGS. 3-8 can be used providing that both tubes are of the same construction.

Tubes 86 and 88 have valves 116 and 118 near the bottoms thereof which are openable for admitting liquid 92 from tank 94 and closable for closing the tubes to the tank. When tubes 86 and 88 are first inserted into tank 94, both valves are closed. Each valve 116 and 118 is then opened for calibration and testing of sensors 90, 96 and 98. Calibration and testing are described above with reference to FIG. 1. Valve 116 of first tube 86 is closed for leak detection. Valve 118 remains open so that second tube 88 is in communication with liquid 92 in tank 94. The valve 118 at the bottom of tube 88 can remain open for the entire test and does not have to be openable and closable. As with tube 12 in FIG. 1, tubes 86 and 88 have a number of additional valves 120, 122, 124, 126, 128 and 130 located near the top of the tube for maintaining an equal vapor pressure between the tubes and the tank. As in FIG. 1 the number and spacing of additional valves may vary.

System 84 has an absolute pressure sensor 90 near the bottom of one of the tubes and open to tank 94 for measuring a first level 93 of liquid 92 in the tank at the beginning of the test. The same height measurement sensors used to make the height measurements in the one-tube system of FIG. 1 may also be used to make measurements in the two-tube system of FIG. 9. In addition, a float measurement system can also be used. A sensor 96 measures a second level of liquid in first tube 86. A sensor 98 measures a third level of liquid in second tube 88. Sensors 96 and 98 are floats whose displacements are measured by a commercially available linear digital position transducer such as the Sony magnetic transducer, the Dynamics Research Corporation optical transducer or the Farrand Controls capacitance transducer. All of these devices measure position to 50 micro-inches or better. Sensors 96 and 98 may, alternatively, be replaced with a differential pressure sensor like sensor 18 in FIG. 1. A differential pressure sensor would be open at one end to first tube 86 and at the other end to second tube 88. In addition, optical or acoustic liquid level measurement sensor systems may be used.

Second tube 88 is required whenever measurement of the level of liquid in a tube is affected by the tube containing the liquid, by the sensor in the tube or when the tube is required to hold the sensor near the liquid surface. For example, meniscus effects in a tube may be large enough to produce a significant error in the level measurement. This is particularly true when the level liquid is near the top or bottom of a tube where the cross-sectional area of the tube is small or when the diameter of the spiral tube is small. A second tube 88 may also be required when delicate sensors are used which require protection.

Figures 10, 11:
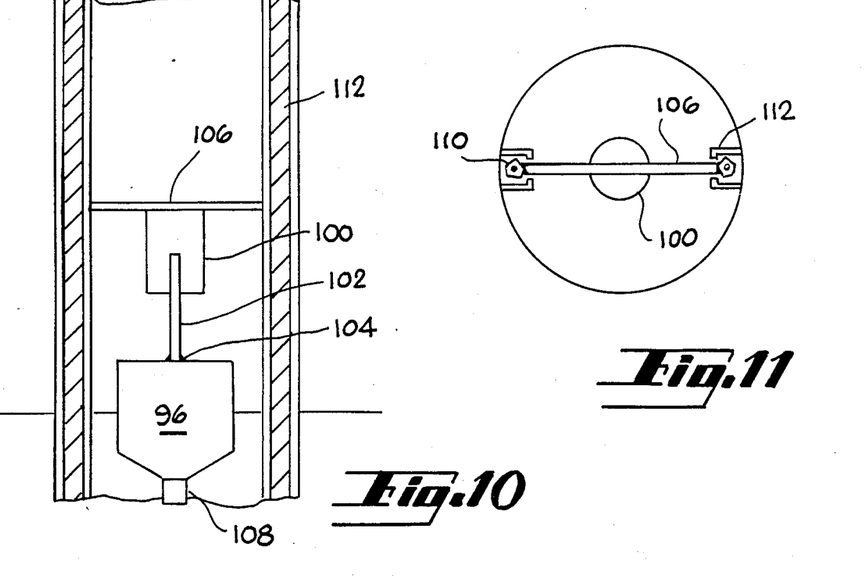
FIG. 10 is a side view showing a float and height measurement sensor used in the system of FIG. 9.
FIG. 11 is a top view of the sensor of FIG. 10.

With reference to FIGS. 10 and 11, the displacement of the float 96 can be measured using one of two general types of commercially available digital position transducers, i.e., height sensors. One type measures the vertical displacement of a stroking arm located in a cylinder and the other type measures the vertical displacement of a slider mounted on a linear track.

The stroking arm 102 of the first type of linear position height measurement sensor, e.g., Sony Digital Gauging System G Series, is rigidly attached to the top of float 104. As the float 96 moves up or down with the liquid, the stroking arm 102 moves up and down. The vertical displacement is measured by the height sensor 100. The height sensing unit 100 is rigidly attached to and held in place by the cross bar 106 and locking cam 110. The cross bar 106 fits into the pair of parallel, spaced apart channels 112 and can slide up or down the tube. When the float has been positioned on the liquid, the locking cam 110, located in the channel 112, is turned from the surface. The large end of the cam 110 pinches the cross bar 106 and holds the height sensing unit 100 in place until the completion of the test. A small weight 108 is placed at the bottom of the float to assure that the float floats vertically. The maximum diameter of float 96 is about one-half the tube diameter at the center of the tank in order to ensure free movement of the float and also to ensure that float 96 will fit into the smaller cross-sectional areas of the tube over a substantial portion of possible tank levels. The particular construction of the float sensor described here is suitable for use in the tubes of FIGS. 3 and 4, of FIGS. 5 and 6, and of FIG. 7. Other float constructions may also be used. Tube constructions of the spiral type shown in FIG. 8 are not generally adaptable for floats, so differential pressure sensors are preferred for spiral tubes.

We claim:

1. A system for leak detection and measurement in liquid storage tanks having vertical walls and a cross-sectional area variation, varying with height from the bottom of the tank upwardly, said tanks having small diameter fillholes in the tops of the tanks, comprising,
    a first tube and an attached instrument package, having a maximum cross-sectional dimension smaller than the diameter of the fillhole, the tube and instrument package being completely insertable into the tank through the fillhole, the tube and instrument package vertically mountable in said tank, said first tube having a cross-sectional area which varies with height in proportion to the tank wall cross-sectional area variation with respect to height, said first tube being openable and closable for admitting liquid from said tank and for closing said tube to liquid in said tank, said liquid being at a first level in said tank and at a second level in said first tube, said first and second levels being initially the same when said first tube is open to said tank,
    means for measuring said first level repetitively at a rate of at least 0.1 Hz,
    means for measuring repetitively at a rate of at least 0.1 Hz a difference between said first and second levels after first tube is closed to said tank,
    means for determining tank leakage from said measured first level and said measured difference.

2. The system of claim 1 wherein said means for measuring said first level is an absolute pressure sensor on said first tube and open to said tank.

3. The system of claim 1 wherein said means for measuring said difference is a differential pressure sensor, said differential pressure sensor being open on one side to liquid in said first tube and open on an opposite side to liquid in said tank.

4. The system of claim 1 wherein said first tube has an elliptical cross-section with a constant circumference, said elliptical cross-section having a ratio between major and minor axes of said elliptical cross-section which is variable with height.

5. The system of claim 1 wherein said first tube has a rectangular cross-section with a width and a length, at least one of said width and length varying with height.

6. The system of claim 1 wherein said first tube has a circular cross-section, said circular cross-section having a diameter which is variable with height.

7. The system of claim 1 wherein said first tube comprises a tube having a constant cross-sectional area and wound in a spiral with a number of turns about a vertical axis, the number of turns per unit height varying with height.

8. The system of claim 1 further comprising a second tube attached to the instrument package, having a maximum cross-sectional dimension smaller than the diameter of the fillhole, the tubes and instrument package being completely insertable into the tank through the fillhole, the tubes and instrument package vertically mountable in said tank, said second tube having a cross-sectional area which varies with height in proportion to said variation of said tank wall cross-sectional area, said second tube being open near the bottom thereof for admitting liquid from said tank, said liquid being at a third level in said second tube essentially equal to said first level, said means for measuring said difference between said first and second levels being means for measuring a difference between said first level and said third level.

9. The system of claim 8 wherein the cross-sectional area of the second tube at a height is equal to the cross-sectional area of the first tube at said height.

10. The system of claim 8 wherein said means for measuring said difference between said first and third levels is a differential pressure sensor, said differential pressure sensor being open on one side to said liquid in said first tube and open on an opposite side to liquid in said second tube.

11. The system of claim 8 wherein said means for measuring said difference between said first and third levels is a pair of floats in said first and second tubes respectively, the vertical displacements of said floats being measured.

12. A system for leak detection and measurement in liquid storage tanks having vertical walls and a cross-sectional area variation, varying with height from the bottom of the tank upwardly, said tanks having small diameter fillholes in the tops of the tanks, comprising,
    a first tube and an attached instument package, having a maximum cross-sectional dimension smaller than the diameter of the fillhole, the tube and the instrument package being completely insertable into the tank through the fillhole, the tube and instrument package vertically mountable in said tank, said first tube having a cross-sectional area which varies with height in proportion to the tank wall cross-sectional variation with respect to height, said first tube being openable and closable near the bottom thereof for admitting liquid from said tank and for closing said tube to liquid in said tank, said liquid being at a first level in said tank and at a second level in said tube, said first and second levels being initially the same while said first tube is open to said tank, a second tube attached to the instrument package, having a maximum cross-sectional dimension smaller than the diameter of the fillhole, the tubes and instrument package being completely insertable into the tank through the fillhole, the tubes and instrment package vertically mountable in said tank, said second tube having a crosssectional area variation equal to the second cross-sectional area variation of the first tube, said second tube being open near the bottom thereof for admitting liquid from said tank, said liquid being at said first level in said second tube, means for measuring repetitively at a rate of at least 0.1 Hz said first level in said tank, means for measuring repetitively at a rate of at least 0.1 Hz a difference between said first level in said second tube and said second level in said first tube, and means for determining a rate of tank leakage from said measured first level and said measured difference.

13. The system of claim 12 wherein said first and second tubes have elliptical cross-sections with constant circumferences, said elliptical cross-section having a ratio between major and minor axes of said elliptical cross-section which is variable with heights.

14. The system of claim 12 wherein each of said first and second tubes has a rectangular cross-section with a width and a length, at least one of said width and length varying with height.

15. The system of claim 12 wherein said first and second tubes have a circular cross-section, said circular cross-section having a diameter which is variable with height.

16. The system of claim 12 wherein each of said first and second tubes comprises a tube having a constant cross-sectional area and wound in a spiral with a number of turns about a vertical axis, the number of turns per unit height varying with height.

17. A method for detecting and measuring leaks in liquid storage tanks having vertical walls and a cross-sectional area variation, varying with height from the bottom of the tank upwardly, said tanks having small diameter fillholes in the tops of the tanks, comprising, completely inserting a first tube and an attached instrument package, having a maximum cross-sectional dimension smaller than the diameter of the fillhole, vertically into said tank through the fillhole, said first tube having a cross-sectional area which varies with height in proportion to the tank wall cross-sectional variation with respect to height, liquid being at a first level in said tank, opening said first tube near the bottom thereof to admit liquid from said tank into said first tube, said liquid being at a second level in said first tube, closing said tube to liquid in said tank, measuring repetitively at a rate of at least 0.1 Hz over a time period said first level and a difference between said first and second levels, and determining a rate of tank leakage from said measured first level and said difference.

18. The method of claim 17 further comprising measuring said first level both before and after closing said first tube, and testing the change in said measured first level against an expected change.

19. The method of claim 17 further comprising completely inserting with said first tube and the attached instrument package a second tube, said second tube having a maximum cross-sectional dimension smaller than the diameter of the fillhole, vertically into said tank through the fillhole, said second tube having a cross-sectional area which is equal to said cross-sectional area of said first tube at each height, and opening said second tube near the bottom thereof to admit liquid from said tank into said second tube, said liquid being at a third level in said second tube wherein measuring said difference between said first and second levels is performed by measuring a difference between said second and third levels.

20. The method of claim 19 further comprising measuring the first level both before and after closing said first tube, and testing the change in said measured first level against an expected change.

* * * * *